Sept. 13, 1932.   O. E. YOUNG   1,877,113
FILE STRUCTURE AND METHOD OF MAKING AND USING THE SAME
Filed July 15, 1931   5 Sheets-Sheet 1

Inventor
Oliver E. Young
By A. Tates Howell
Attorney

Sept. 13, 1932.     O. E. YOUNG     1,877,113
FILE STRUCTURE AND METHOD OF MAKING AND USING THE SAME
Filed July 15, 1931    5 Sheets-Sheet 2
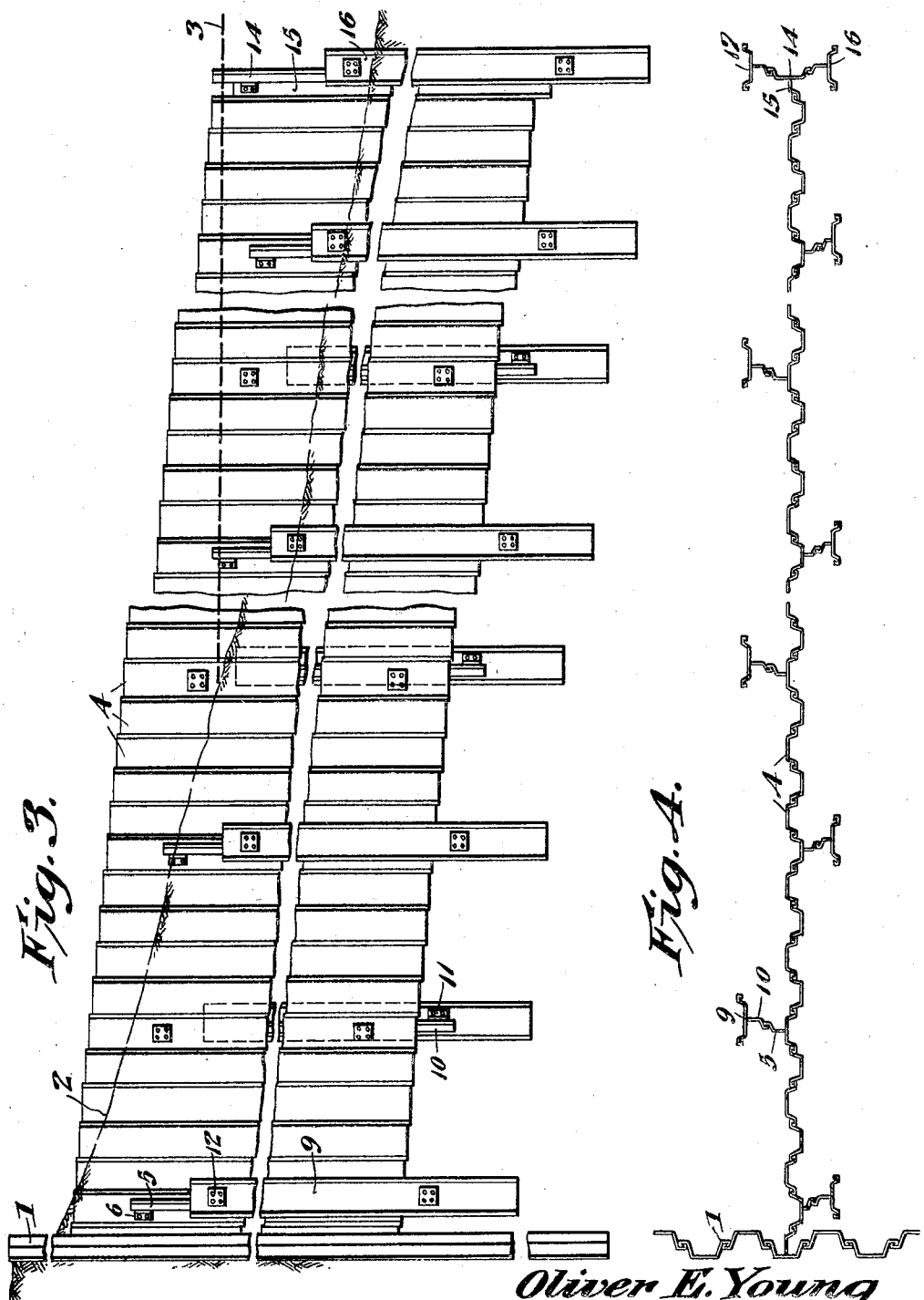

Oliver E. Young
By A. Gates Howell
Attorney

Sept. 13, 1932.   O. E. YOUNG   1,877,113
FILE STRUCTURE AND METHOD OF MAKING AND USING THE SAME
Filed July 15, 1931   5 Sheets-Sheet 4

Inventor
Oliver E. Young
By A. Gates Rowell
Attorney

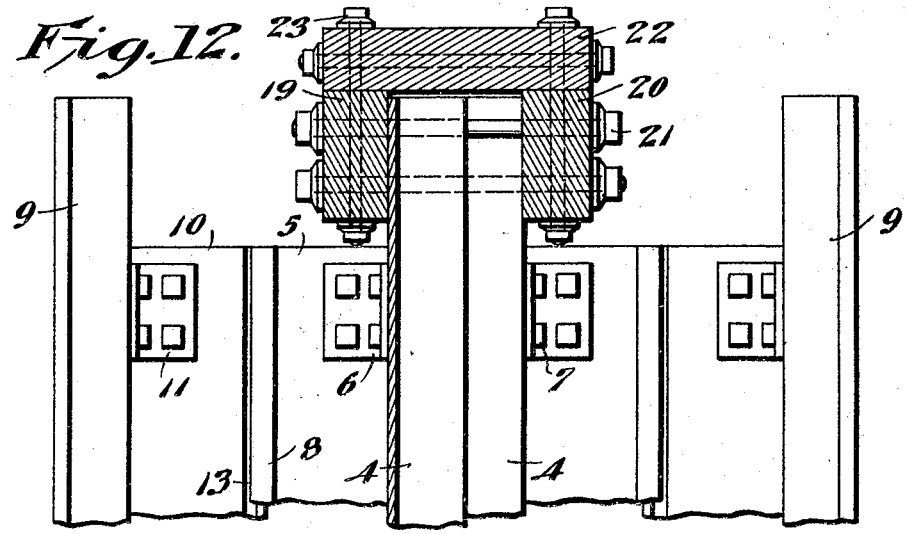
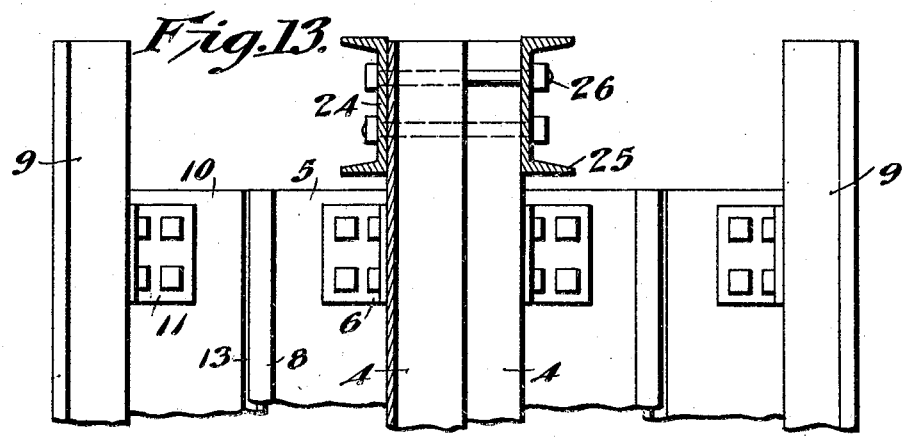
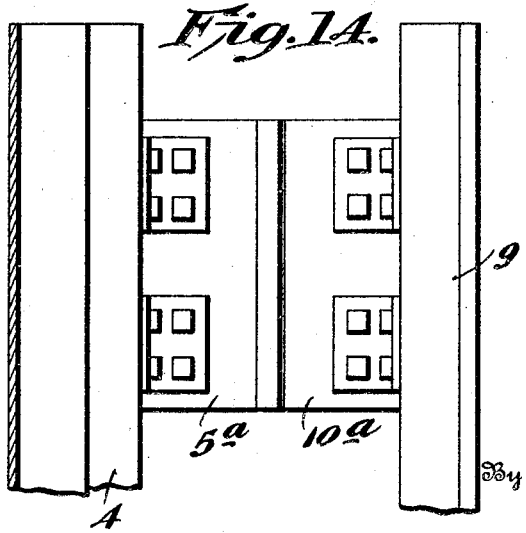
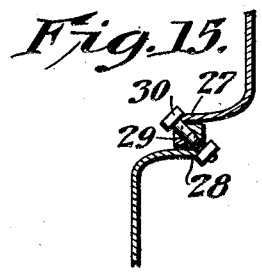

Patented Sept. 13, 1932

1,877,113

UNITED STATES PATENT OFFICE

OLIVER E. YOUNG, OF WEST PALM BEACH, FLORIDA

PILE STRUCTURE AND METHOD OF MAKING AND USING THE SAME

Application filed July 15, 1931. Serial No. 550,982.

My invention relates to pile structures and the method of making and using the same, and particularly to a structure of this character for preventing waves or currents of water from washing away a beach, shore, or the like.

An object of my invention is to provide a simple, effective and economical pile structure that will give a line of sheet pile, of any desired shape and size, and lateral buttress piles interposed or erected at any desired points to afford great lateral strength or side anchorage to thus hold against lateral pressure, and which side supporting and anchorage structure serves to effectively prevent the formation of eddies or other currents to swirl along or backwash against the pile structure to thus cause erosion.

Another object is to provide a structure that can be built as a groyne and which includes buttress or side anchoring piles associated in unitary relation with the line piles to form interlocking laterally projecting buttresses to break up currents flowing against said groyne structure and create quiet zones to encourage deposition of material to build up adjacent to said pile structure.

A further object is to provide a structure of the type set forth which, while particularly adapted for use in groynes and similar structures can be employed in the construction of cofferdams; training walls, spur dikes and other structures used in river regularization work, sub-aqueous forms (as for concrete work); cores for rock jetties or breakwaters; and in many other connections where a line of sheet piling is to be erected and must have lateral or side anchoring support.

Yet another object is to provide a method of using sheet pile which consists in erecting a continuous line of piles of any desired shape or form and then associating therewith lateral buttress or anchoring piles disposed at spaced points along the length of the line of sheet piles and each interlocking substantially throughout its length with an adjacent pile of the line.

Still another object is to provide a method of using the pile structure as above set forth for reclaiming and retaining beaches to guard against erosion and provide for accretion, which consists in erecting a groyne of sheet pile extending into a body of water substantially across the line of normal current movement, and then erecting buttress piles at spaced points along the length of said groyne structure to stop the flow of currents or eddies along the length of the groyne structure and create substantially quiet zones adjacent the groyne structure.

With the above and other objects in view, which will be apparent to those skilled in the art, my invention includes certain novel features of construction and combinations of parts which will be hereinafter set forth in connection with the drawings.

In the drawings:

Fig. 3 is an enlarged view in side elevation to better show the construction and manner of erecting the groyne structure.

Fig. 4 is a top plan view of the showing in Fig. 3.

Figs. 11, 12 and 13 are views similar to Fig. 10 illustrating modified constructions.

Fig. 14 is a fragmentary detail view illustrating another modification.

Fig. 15 is a fragmentary sectional view showing a modified securing means.

Figure 1:
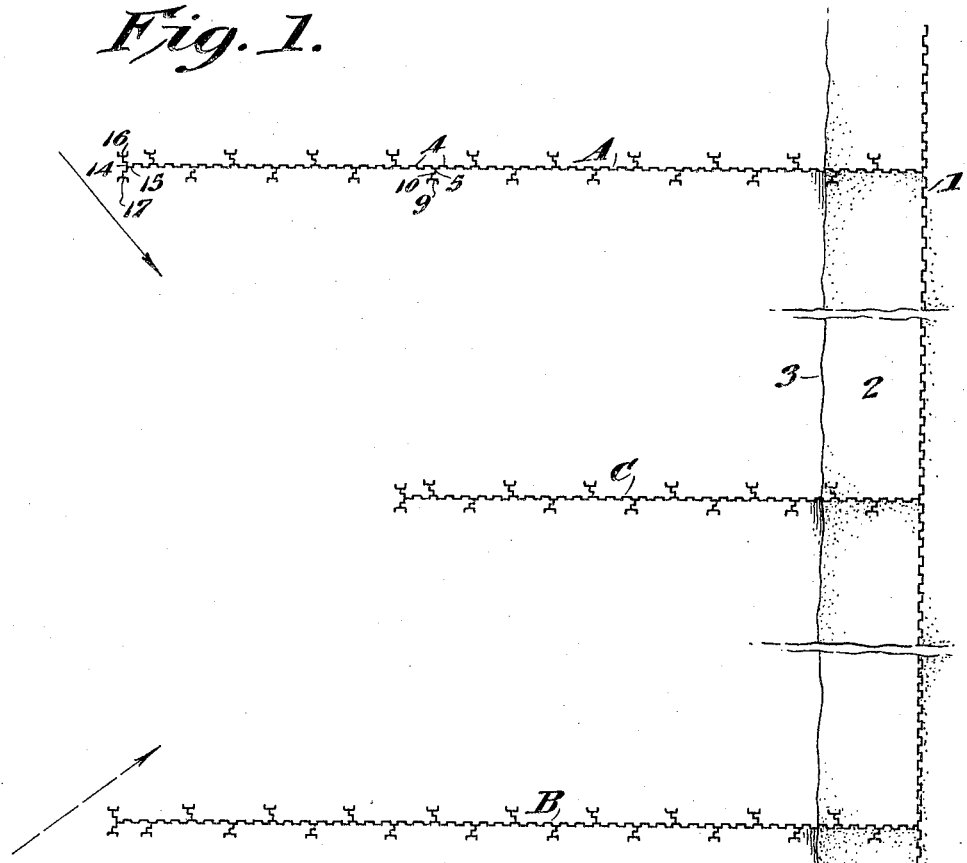
Figure 1 is a plan view of a shore and adjacent breakwater and groyne structures erected in accordance with my invention.

As the parts are illustrated in Fig. 1, the pile structure is erected for and is intended to be used in reclaiming and retaining a beach to prevent erosion of the shore by littoral currents, created by prevailing inshore winds or storms driving in a direction oblique to the shore line, and it will be appreciated that each installation will be made to suit the varying conditions at the particular point of use, the main purpose being to provide a simple, effective and economical means for preventing waves or currents of water from washing away the beach and shore and for so retarding the flow of the water that a quiet zone is created of sufficient area to afford time for the deposit of sand or other material held in suspension by the water, the result being a gradual accretion of this deposited material at and near the groyne structure until the beach has been built up to, or near, the elevation of the top of the same.

Figure 2:
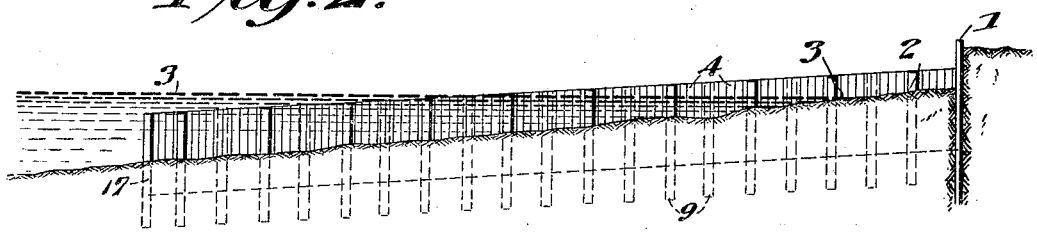
Fig. 2 is a sectional elevation across the shore line as illustrated in Fig. 1 to better illustrate the exact relation of the groyne structure to the floor of the shore.

With the showings in Figs. 1 and 2, the solid earth or bank will be behind the bulkhead or sea wall 1, and ordinarily a beach may be present at 2, above the normal water line as indicated at 3. It is seldom that the prevailing wind-induced or other currents will be directly at right angles to the shore line, and in the present instance the protective system has been erected to suit conditions where the prevailing wash or current is at an oblique angle towards the shore behind the bulkhead or sea wall 1, perhaps substantially at the angle indicated by the arrow.

As here illustrated, the groyne structures A and B are provided to extend for a considerable distance into the water, outwardly beyond the normal shore line, and an intermediate groyne C is shown as being relatively shorter.

It will be appreciated that a single groyne might be used or that a great number set at properly calculated spaced points along the shore or beach might be employed, the purpose being to erect the same where the groyne will function most effectively.

Figure 7:
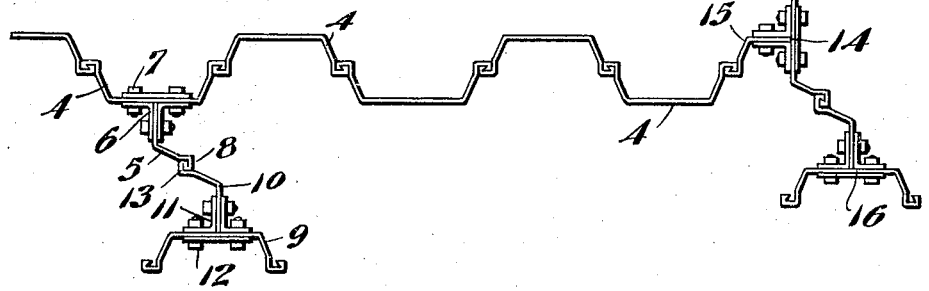
Fig. 7 is a fragmentary plan view of the seaward end of a groyne using one type of steel sheet piling.
Figure 8:
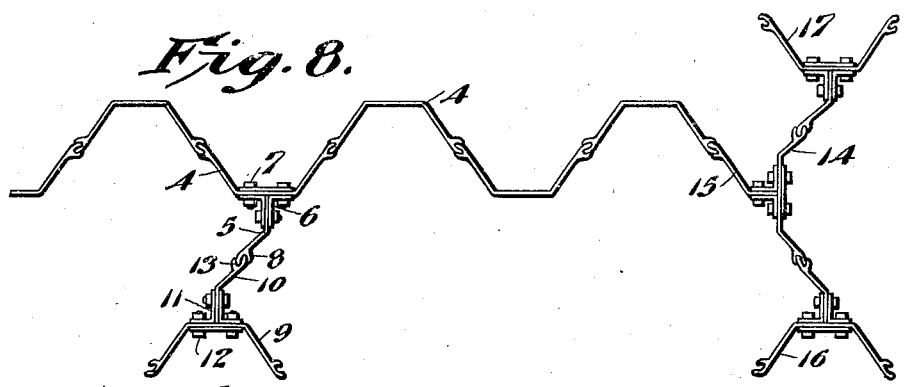
Figs. 8 and 9 are views similar to Fig. 7 illustrating the use of other types of piling.
Figure 9:
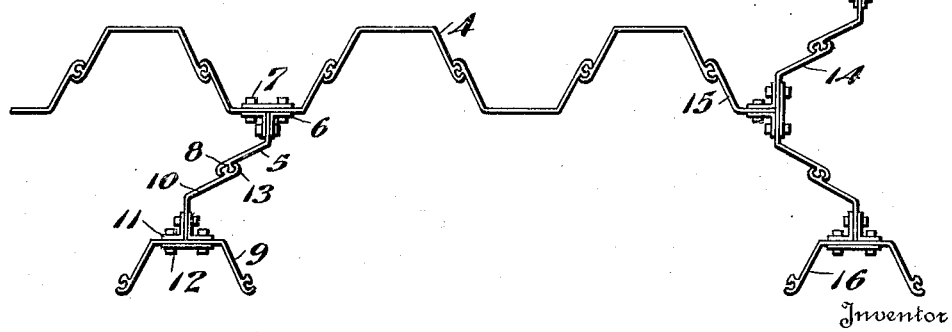

As illustrated in Figs. 3 and 4, the main portion of the groyne consists of a line of sheet piles 4 driven or otherwise set to take the form desired and extended to the proper distance from the shore. These sheet piles 4 are of the interlocking steel piling form, and as illustrated in Figs. 7, 8 and 9, any and various types of steel sheet piling have been found suitable. It will be appreciated that many other styles and types of sheet piling than those illustrated in the drawings can be employed, and that piling of various sections, weights, and dimensions can be used. The primary object is to provided a structure with which the fabricating can be entirely done before the erection of the structure, so that it is not necessary that any work be done under water. In any instance, the assembly and the general result will be substantially the same, and it is to be understood that the present disclosure is intended as being only illustrative of the general embodiment, irrespective of the particular form and make of materials used.

At spaced points along the length of the groyne structure, certain of the line piles 4, have lateral sections 5 connected therewith by the use of clips 6 and bolts 7, or by any other suitable means, these sections 5 being provided on their outer edges with interlocking flanges 8. The particular line piles 4 having the sections 5 connected therewith can be driven or assembled in the line at any desired spaced intervals and in the present instance they are shown as spaced and assembled in staggered relation so that the sections 5 are disposed at spaced points and in staggered relation on opposite sides of the line of sheet piles 4 forming the body of the groyne.

Buttress piles 9, which can be in all respects similar to the line piles 4, have interlocking sections 10, connected therewith by means of clips 11 and bolts 12 or by any other suitable means or method of fastening or assembly, and to all intents and purposes these buttress piles might be substantially the same as and be interchangeable with the line piles carrying the sections 5. The section 10 of the buttress pile has an interlocking flange 13 at its outer edge to interfit with the flange structure 8 of the section 5. In driving or erecting the complete structure the buttress pile 9 has the flange 13 interfitted with the flange 8 so that each buttress pile is interlocked substantially throughout its length with the adjacent line pile. As the sections 5 and 10 space the buttress pile 9 from the adjacent line pile 4 and the flat side of the buttress pile extends substantially parallel with the line piles, a considerable side anchorage is given in addition to the lateral support of the groyne or line structure incident to the side positioning of the buttress pile. The fact that the buttress pile is interlocked substantially throughout its length with the adjacent line pile increases the rigidity of the structure and forms a substantially continuous lateral extension that will break up water currents flowing along the side of the line piles thus effectively preventing eddies or erosive currents that would scour out the material along the sides of the main line of piles and at the same time creating a quiet zone where sand or other material carried by the water will be deposited adjacent to and against the main line of piles.

At the outer end of the line of sheet piles 4 a head pile 14 is driven or otherwise erected with its width extending substantially at right angles to the line piles 4, this head pile 14 being provided with a section 15 having an edge flange to interlock with the flange of the last pile 4 at the head end of the line, the pile 14 being in all respects substantially similar to the buttress pile 9, if desired. The lateral anchoring or buttressing is further carried out at the head end by driving or erecting buttress piles 16 and 17 disposed laterally with respect to head pile 14 and having the flanges of the sections thereof interlocking substantially throughout their length with the flanges of the head pile.

As shown in Fig. 3, the buttress piles can be driven or otherwise sunk so that their ends will be below the tops of the line piles 4, and in this manner of erection the buttress piles of a length equal to the line piles will have a greater penetration.

Figure 5:
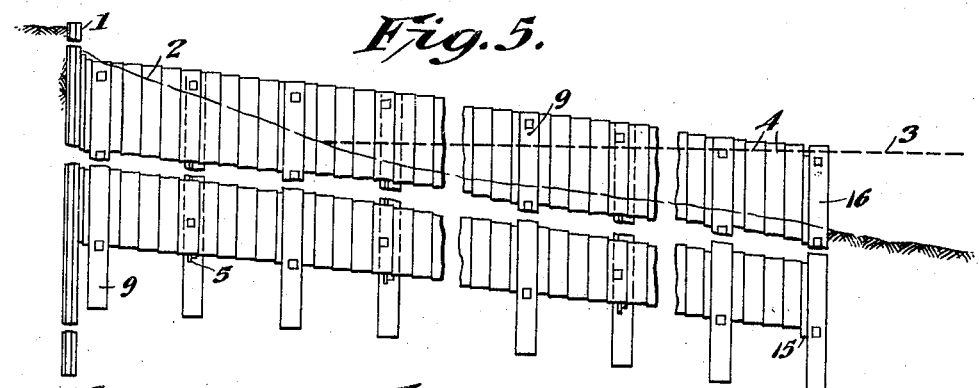
Fig. 5 is a view similar to Fig. 3 illustrating a modified construction.

On the other hand, where great lateral strength and bracing is required for the exposed part of the main line of piles 4, the buttress piles can be driven or erected after the manner illustrated in Fig. 5 so that their upper ends are substantially even with the adjacent line piles. In either instance, the buttress piles can be of the same or of different length with respect to the line piles, and buttress piles of different lengths can be used to suit particular requirements met in each individual installation.

As shown particularly in Figs. 1, 3 and 5, the line piles 4 will be preferably driven or otherwise erected to conform substantially to the normal line of the floor of the beach, and as accretion takes place the beach will be built up so that the normal line will be preserved. In Fig. 1 I have illustrated the groyne structure extending for a considerable distance into the water so that the outer end is considerably submerged, and in some instances it may be found necessary or desirable to taper down the outer end more sharply to meet the floor of the body of water, or perhaps to retain the elevation of the outer end for a predetermined and fixed depth of submergence below the normal water level, but it will be understood that the exact shape and length will depend greatly upon the conditions found and to be remedied in each individual installation. In some instances, as where the pile structure is used entirely for reclaiming and retaining beaches, or for filling in between a shore and a sand bar, or in other connections of this sort, a bulkhead or wall may not be employed, and in such cases the inner end of the groyne or line of piles 4 will be driven or erected to merge into the adjacent shore structure in a manner best suited to the particular installation.

Figure 6:
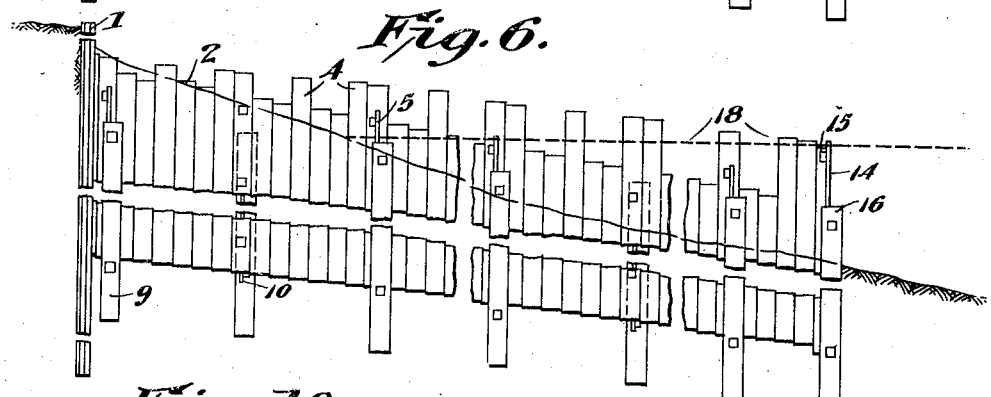
Fig. 6 is a view in elevation showing another modified arrangement and construction.

At some points it may be found desirable to permit a partial flow of the water over and through the groyne structure without checking the entire flow or interposing a solid buttress wall, and this can be readily accomplished by the use of my invention in the manner illustrated in Fig. 6. As here shown, part of the line piles 4 are driven or erected to have their upper ends stopped at different elevations, thus giving a snaggle-toothed effect at the top of the groyne. In this instance, the inshore end is shown as being substantially solid and continuous and the submerged end is of snaggle-toothed form, the offset being increased toward the end of the line of piles. Where such a construction is employed the spaces at 18, where the water is normally permitted to flow through, can be closed as sand or other material is deposited, and in this way the groyne structure can be maintained at all times in the most efficient form to accomplish the desired result.

Figure 10:
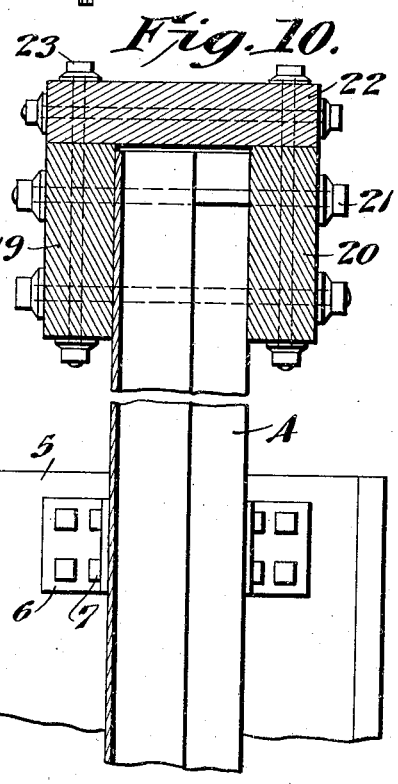
Fig. 10 is a fragmentary transverse sectional view showing a cap and side belting for the line of piles.

As shown in Fig. 10, side timbers or belts 19 and 20 are secured upon the upper ends of the line piles 4, which extend above the upper ends of the buttress piles 9, 16 and 17, these side belts being secured in place by bolts 21 or other suitable fastenings. To complete the capping of the line of piles a timber 22 can be placed upon the side belts 19 and 20 and secured thereto by means of bolts 23, or other suitable fastenings. With this construction and arrangement, a very effective cap structure is provided on the main line of piles 4 to protect and reinforce the same, and the line of piles in the groyne structure is effectively bound and tied together as a substantially continuous sheet.

Figure 11:
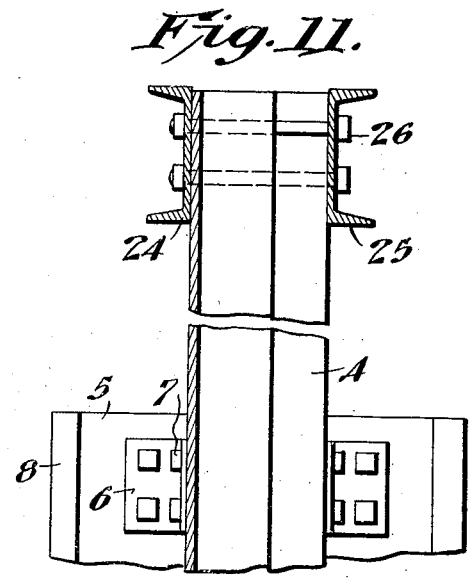

In Fig. 11 I have illustrated channel irons 24 and 25 applied at the uper ends of the line piles 4 as side belts, these channel irons being held in place by bolts 26 or other suitable fastenings. This construction and arrangement might be employed with the snaggle-toothed construction illustrated in Fig. 6, and as the top is opened, short sections or fillers of sheet piling could be inserted to close up the snaggle-toothed effect at any time desired.

Figs. 12 and 13 of the drawings illustrate constructions similar to but somewhat modified from the showing in Figs. 10 and 11, and in this disclosure it will be noted that the buttress piles have other upper ends at the elevation of the line piles, similar to the showing in Fig. 5. Where a side belt or cap structure is to be applied to a groyne of this construction the members 5 and 10 of the sheet or line piles and the buttress piles will be stopped sufficiently short of the upper end of the line piles and buttress piles to permit placement of the belt or cap structure.

As illustrated in Fig. 14, the connecting members 5a and 10a on the line piles 4 and buttress piles 9 can be made relatively short, and a plurality of these interlocking connecting members can be provided throughout the length of the pile members. In this way, it is possible to interlock or interconnect the buttress piles with the line piles to give lateral support and anchorage, and the provision of short lengths instead of continuous connecting strips results in a considerable saving in material.

With the parts as shown in Fig. 15, an opening or hole is drilled, burned, or otherwise formed through the interlocking flange portions 27 and 28 of adjacent pile members, the opening being indicated at 29. A bolt or other fastening 30 is then passed through the opening 29 and in this manner the adjacent piles are securely connected together so that there cannot be any longitudinal shifting of the one with respect to the other. This same connecting means might be employed at any desired points in connection with the line of buttress piles.

From the foregoing it will be seen that I have provided a pile structure and method of making and using the same which presents a line of sheet piles rigidly braced and supported by lateral buttresses or anchor piles interlocked substantially throughout their lengths with adjacent piles of the line, and that substantially this same structure in a more efficient form is employed at the seaward or outer end of the line. Also, it will be understood that by the use of this structure I have provided for efficient reclaiming and retaining of beaches, shore structures, and the like.

In each instance in the present illustration I have shown the lateral or buttress piles of special construction, but it is to be understood that lateral or buttress piles similar to the line piles 4 might be used by simply interlocking one of the side flanges thereof with the interlocking portion of the member 5, and this same arrangement might be carried out at the seaward end of the structure.

While I have herein shown and described only certain specific embodiments of my invention and have suggested only certain possible modifications in the form, construction, arrangement, assembly and use of the parts, it will be appreciated that many other changes and variations can be made to suit various requirements of use, without departing from the spirit and scope of my invention.

I claim:

1. A groyne structure comprising a line of sheet piles extending from the shore out into the water and buttress sheet piles disposed laterally at spaced points along said line interlocking substantially throughout their length with adjacent piles in the line.

2. A groyne structure comprising a line of sheet piles extending from the shore out into the water and a plurality of buttress sheet piles disposed at spaced points on opposite sides of said line and interlocking substantially throughout their length with adjacent piles in the line.

3. A groyne structure comprising a line of interlocking sheet piles extending from the shore out into the water and a plurality of buttress sheet piles disposed in staggered relation on opposite sides of said line and interlocking substantially throughout their length with adjacent piles in the line.

4. A groyne structure comprising a line of sheet piles extending from the shore out into the water and a head ending for said line consisting of buttress sheet piles disposed laterally on each side at the end, and said buttress piles interlocking substantially throughout their length with an adjacent pile in said line.

5. A groyne structure comprising a line of sheet piles extending from the shore out into the water, buttress sheet piles disposed laterally at spaced points along said line interlocking substantially throughout their length with adjacent piles in the line, and a head ending for said line consisting of buttress sheet piles disposed laterally on each side at the end and each interlocking substantially throughout its length with the adjacent pile in said line.

6. A groyne structure comprising a line of sheet piles extending from the shore out into the water, buttress sheet piles disposed laterally at spaced points along said line interlocking substantially throughout their length with adjacent piles in the line and having their upper ends somewhat below the upper ends of the line piles, and side belt members secured upon the upper ends of said line piles to cap and reinforce the structure.

7. A groyne structure comprising a plurality of sheet piles assembled together in interlocking relation in a line extending from the shore out into the water, a plurality of buttress sheet piles disposed at spaced points and in staggered relation on opposite sides of said line, said buttress piles interlocking substantially throughout their length with adjacent piles in the line and having their upper ends lower than the upper ends of the line piles, side belt members secured to the upper ends of the line piles, and a head ending for said line consisting of buttress sheet piles disposed laterally on each side at the end and each interlocking substantially throughout its length with a pile in said line.

8. A groyne structure comprising a plurality of sheet piles assembled in line with the upper end of the piles of unequal length to present a snaggle-toothed effect, and buttress sheet piles disposed laterally at spaced points and on opposite sides along said line interlocking substantially throughout their length with adjacent piles in the line.

9. In a shore protecting pile structure, a groyne extending outwardly from the shore for a distance to have its outer ends submerged, consisting of a line of sheet piling having buttress sheet piles disposed laterally at spaced points along said line interlocking substantially throughout their length with adjacent piles in the line to thus form stops to break up currents swirling along the sides of the line.

10. In a shore protecting pile structure a groyne extending outwardly from the shore for a distance to have its outer end submerged, said groyne comprising a line of sheet piling having the upper ends of the piles of uneven length to present a snaggle-toothed effect to only partly retard flow of water transversely with respect to the groyne and thus cut down backwash, and buttress sheet piles disposed laterally at spaced points and in staggered relation along opposite sides of said line to thus form stops to break up currents swirling along the side of the line, said buttress piles interlocking substantially throughout their lengths with adjacent line piles.

11. In a shore protecting pile structure, a groyne extending outwardly from the shore for a distance to have its outer end submerged, comprising a line of sheet piling, buttress sheet piles disposed laterally at spaced points and in staggered relation along opposite sides of said line and interlocking substantially throughout their length with adjacent piles in the line to thus form stops to break up currents swirling along the side of the line and a head ending for said line consisting of buttress sheet piles disposed laterally on each side at the end and each interlocking substantially throughout its length with an adjacent pile in said line.

12. The method of making pile structures for reclaiming and retaining beaches, comprising erecting a groyne of sheet piles disposed across the line of normal movement of water currents, and interposing therewith a plurality of laterally disposed buttress sheet piles interlocked with the line piles to break up currents induced to swirl along the side of the groyne.

13. The method of making pile structures for reclaiming and retaining beaches comprising, erecting a groyne of sheet piles in a line disposed across the line of normal movement of water currents and having adjacent piles thereof of different lengths to present a snaggle-toothed effect to allow passage of a portion of the water in normal movement, and erecting with said line of piles a plurality of buttress sheet piles interlocking substantially throughout their length with said line and extending laterally to break up currents induced to swirl along the side of the groyne and at the same time reinforce said groyne structure laterally against the strain of the normal movement of water currents.

14. The method of making pile structures for reclaiming and retaining sea beaches, comprising erecting a groyne of interlocking sheet piles disposed across the line of normal movement of the water currents, and erecting on opposite sides of said line at spaced intervals and in staggered relation buttress sheet piles interlocking substantially throughout their lengths with said line piles and disposed to break up currents induced to swirl along the side of the groyne.

In testimony whereof I affix my signature.

OLIVER E. YOUNG.